United States Patent
Falco

(10) Patent No.: US 6,683,909 B1
(45) Date of Patent: Jan. 27, 2004

(54) MACROBLOCK PARSING WITHOUT PROCESSING OVERHEAD

(75) Inventor: Michael A. Falco, Swampscott, MA (US)

(73) Assignee: Ezenial Inc., Burlington, MA (US)

( * ) Notice: Subject to any disclaimer, the term of this patent is extended or adjusted under 35 U.S.C. 154(b) by 0 days.

(21) Appl. No.: 09/526,676

(22) Filed: Mar. 16, 2000

(51) Int. Cl.$^7$ .................................................. H04N 7/12
(52) U.S. Cl. ............................. 375/240.24; 375/240.25
(58) Field of Search ....................... 375/240.24, 240.25, 375/240.28; 348/584

(56) References Cited

U.S. PATENT DOCUMENTS

| | | | | |
|---|---|---|---|---|
| 5,764,277 A | * | 6/1998 | Loui et al. ................ | 348/14.01 |
| 5,781,248 A | * | 7/1998 | Chida ......................... | 348/584 |
| 5,796,743 A | * | 8/1998 | Bunting et al. ............. | 370/474 |
| 5,821,886 A | * | 10/1998 | Son .............................. | 341/67 |
| 5,835,144 A | * | 11/1998 | Matsumura et al. ... | 375/240.23 |
| 5,847,763 A | * | 12/1998 | Matsumura et al. ... | 375/240.15 |
| 5,959,672 A | * | 9/1999 | Sasaki .................... | 375/240.23 |
| 6,111,924 A | * | 8/2000 | McKinley .................... | 375/354 |
| 6,141,448 A | * | 10/2000 | Khansari et al. ............ | 382/236 |
| 6,154,780 A | * | 11/2000 | Zhu ............................ | 709/236 |
| 6,285,661 B1 | * | 9/2001 | Zhu et al. .................... | 370/260 |
| 6,357,028 B1 | * | 3/2002 | Zhu ........................... | 714/751 |
| 6,389,073 B1 | * | 5/2002 | Kurobe et al. ......... | 375/240.03 |

* cited by examiner

Primary Examiner—Chris Kelley
Assistant Examiner—David Czekaj
(74) Attorney, Agent, or Firm—Cesari and McKenna, LLP

(57) ABSTRACT

The method and apparatus related to macroblock parsing in a GOB to comply with a maximum-transmission-unit size is described. The real-time transmission protocol (RTP) suggests that the RTP packet sent be smaller than the underlying transport mechanism. In the case where video streams are encoded under ITU-T H.261 recommendation, certain group of blocks (GOBs) exceed the allowable packet size. For end-points such as a terminal, implementing a macroblock parser is a natural outcome of the encoding process. However, for other devices, such as a multipoint control unit (MCU), a marcoblock parser is not that easily implemented. Thus, instead of using a macroblock parser, the incoming packets are monitored for partial GOBs. A partial GOB is where the GOB was previously parsed into portions by a device for compliance. Once a partial GOB is detected, pertinent information pertaining to the macroblock fragmentation is then retrieved and stored for future use. The pertinent partial GOBs are then combined to form a complete GOB. Subsequently, when this complete GOB needs to be parsed again for transmission, the stored information are retrieved to parse the complete GOB back to its previous state (i.e., partial GOBs).

21 Claims, 10 Drawing Sheets

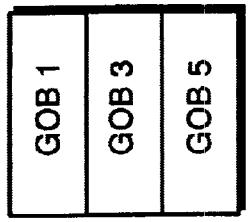
FIG. 7
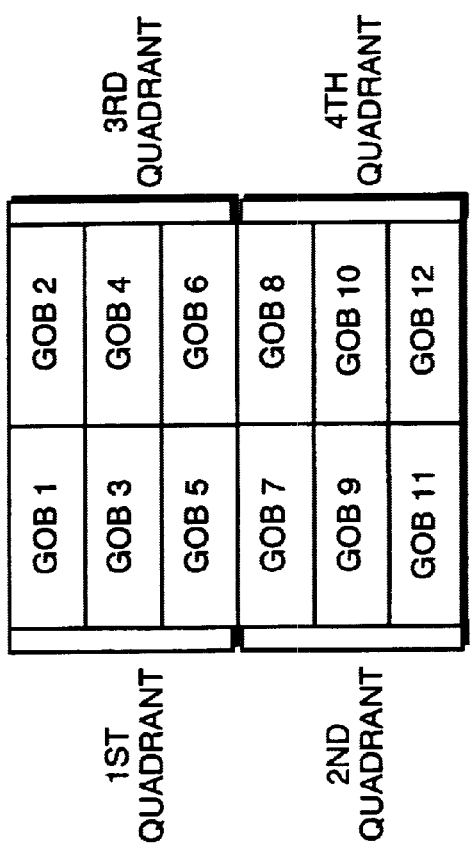
FIG. 6
FIG. 9

MACROBLOCK PARSING WITHOUT PROCESSING OVERHEAD

BACKGROUND OF THE INVENTION

1. Field of the Invention

This invention relates to video teleconferencing, and in particular, to complying with the maximum-transmission-unit size supported by the underlying transport mechanism.

2. Background Information

A video teleconference, as its name implies, is a conference in which several audio-visual terminals located remotely from each other participate. In one instance, the videoconferencing system allows for the simultaneous exchange of video, audio, and other data between terminals. As FIG. 1 shows, an example of such a system is a plurality of interconnected terminals 11, 12, 15, and 16. For the sake of example, the drawing shows the transmission medium as including an Integrated Services Digital Network (ISDN), and a Transport Control Protocol/Internet Protocol (TCP/IP) network. In other words, videoconferencing can be performed by way of packet-switched networks as well as circuit-switched networks. A gateway 22 translates between protocols in the example.

A multipoint control unit (MCU) 20 receives signals from the various terminals, processes these signals in to a form suitable for video teleconferencing, and re-transmits the processed signals to the appropriate terminals. For example, the video signals from the various terminals may be spatially mixed to form a composite video signal that, when it is decoded, may display the various teleconference participants in one terminal. Usually, each terminal has a codec to encode video, audio and/or data signals to send to the MCU for appropriate distribution and to decode such signals from the MCU. Codes for this purpose are we own in the art and are exemplified, for instance, in the International Telecommunication Union (ITU) Telecommunication Standardization Sector recommendation document H.261 (ITU-T Recommendation H.261).

The Telecommunication Standardization Sector of the International Telecommunication Union (ITU-T) is responsible for standardizing the technical aspects of telecommunication on a worldwide basis. Its H-series recommendations concern video teleconferencing H-series. Among other H-series recommendations, H.221 defines frame structure, H.261 defines video coding and decoding, H.231 defines multipoint control units (MCUs), H.320 defines audio-visual terminals, and H.323 defines audio-visual terminals that do not provide a guaranteed quality of service. How the various devices in the video teleconferencing system interact with each other using the various recommendations are now briefly described.

The H.320 terminals employed in the system transmit H.221 frames of multiplexed audio-video and data information. (These frames should not be confused with video frames, which we will hereafter refer to as "pictures" to distinguish them from transmission frames.) Each frame consists of one or more channels, each of which comprises 80 octets of bits, and each of the 8 octet bit positions can be thought of as a separate sub-channel within the frame. In general, certain bits of a given octet will contain video information, certain bits will contain audio information, and certain bits may contain data, as FIG. 2's first row illustrates. Additionally, the eighth bit in certain of a frame's octets (not shown in the drawings) represents control information by which, among other things, frame boundaries can be recognized. The precise bit allocation is determined through a session negotiation process among the involved video teleconferencing terminals.

The H.323 terminals employed in the system use the real-time transmission protocol (RTP), known to one skilled in the art, and set forth in the Request For Comments (RFC) 1889. RFCs are published by the Internet Engineering Task Force (IETF), a community dedicated to standardizing various aspects of the Internet. An H.323 terminal uses separate RTP sessions to communicate the conference's video and audio portions. Thus, as FIG. 2's first through third rows show, a gateway's option of translating from H.221 to RTP involves demultiplexing the H.221 data stream into its video, audio, and data constituents so that the gateway can packetize the video, audio, and data separately. In particular, video bits are extracted from a session of octets and concentrated into a stream that contains only the H.221 transmission's video parts. The stream is encoded in accordance with H.261 recommendation at the terminal using a codec. Note that the encoding may be in accordance with a related H.263 recommendation. However, the H.261 recommendation will generally be focused on here.

FIG. 3 illustrates a typical link layer packet suitable for transmission in accordance with the RTP protocol. If Ethernet is used for the link layer, information is sent to an Ethernet frame that begins and ends with an Ethernet header and trailer, which are used for sending the information to the next stop on the same local network. The frame's contents are in IP datagram, which also includes its own header, specified in RFC 791, for directing the datagram to its ultimate internetwork address. In video conference situations, RTP permits TCP to be used as the transport protocol (i.e., as the protocol for directing the information to the desired application at the destination internet address). However, the User Datagram Protocol (UDP) is preferable to TCP for videoconferencing because TCP's re-transmission of lost video streams is unnecessary under these situations. Thus, FIG. 3 depicts the IP payload as a UDP datagram and includes a UDP header as specified in RFC 768.

Because packet-switched protocol data units do not in general arrive in order, and because real-time information must be presented in a predetermined time sequence, the UDP payload must include information specifying the sequence in which the information was sent and its real-time relationship to other packets. So the payload begins with an RTP header, specified in RFC 1889, that gives this and other information.

The RTP header format, depicted in FIG. 4, is shown as successive four-byte rows. RFC 1889 describes the various FIG. 4 fields' purposes in detail, so only the timestamp field is mentioned here. When information travels by way of a packet-switched network, different constituent packets make their ways to their common destination independently. That is, different packets can take different routes, so the times required for different packets to arrive at their respective destinations are not in general the same, and packets can arrive out of sequence or in time relationships that otherwise differ from those with which their contained information was generated. RTP therefore provides for a timestamp in each packet to indicate the real-time relationships with which the information is to be played. Typically, gateways and H.323 devices (e.g., terminals and MCUs) use a local clock to provide the RTP-required timestamp as they assemble H.261 packets.

However, it would be complicated to play the resultant timestamped information if no notice were taken of the actual contents of the data stream being packetized. For example, a single packet could contain parts of two different video pictures, so parts of the same picture would have the same timestamp, while different parts would have different timestamps. To avoid this, the packets need to be monitored for picture boundaries.

FIG. 2's fourth through seventh rows depict the structure that the incoming data stream uses to represent successive video pictures in accordance with H.261. The fourth row illustrates a data-stream portion covering a single video picture. It shows that the portion begins with a header, and FIG. 5 illustrates that header's structure.

The header field of importance here is the Picture Start Code (PSC). For H.261 streams, that field value is always $00010_H$, a sequence that cannot occur elsewhere in the data stream. If a length of a single-picture portion of the data stream exceeds the underlying protocol's maximum-transmission-unit size, the H.323 device breaks the single picture's data into multiple packets. For such packets, the timestamp entered is the same as that assigned to the last PSC-containing packet. In those instances, RFCs such as RFC 2032 entitled "RTP Payload Format for H.261 Video Streams" and RFC 2190 titled "RTP Payload Format for H.263 Video Streams," both of whose contents are well known to those skilled in this art, specify how the picture's data should be packetized. Packetization can be appreciated by first reviewing the picture data's finer structure.

As FIG. 2's fourth row indicates, the picture data's body portion is divided into "groups of blocks" (GOBs). H.261 specifies a Common Intermediate Format (CIF) in which each GOB represents one-twelfth of the resultant picture area, in a spatial relationship that FIG. 6 illustrates. H.261 also specifies an alternative, more-sparsely sampled quarter-CIF (QCIF) format. When QCIF is employed, each GOB represents one-third of the total picture area, as FIG. 7 illustrates.

FIG. 2's fourth row depicts the GOB fields as being unequal in length. This is because the degree of H.261-specified data compression depends on the source picture's data redundancy, which can differ from region to region.

FIG. 2's fifth row shows that each GOB field has its own header, and FIG. 8 illustrates a GOB header's structure. The GOB header begins with a Group-of-Blocks Start Code (GBSC). That code's value is $0001_H$, a sequence that cannot occur elsewhere (except in the PSC).

The GOB's Group Number (GN in FIG. 8) follows the GBSC code and specifies the GOB region's position in accordance with the scheme shown in FIG. 6 or FIG. 7. Next is a default quantization value GQUANT, which influences the contained data's interpretation by specifying the magnitude intervals at which the values were quantized. The header may additionally contain further, optional fields. FIG. 2's fifth row shows that a GOB is divided into so-called macroblocks, which correspond to subregions within the GOB regions. FIG. 9 illustrates a single-GOB picture segment's division into subregions represented by respective macroblocks. Although there are thirty-three such subregions in a GOB-represented region, FIG. 2 depicts somewhat fewer macroblocks than that, because macroblocks that are redundant in view of previous macroblocks can be omitted in accordance with H.261. (As those familiar with the H.261 specification will recognize, previous may have either a temporal or a spatial meaning; that specification admits of a variety of data-compression techniques.)

FIG. 2's sixth row shows that each macroblock has its own header, and FIG. 10 illustrates that header's structure.

The header's MacroBlock Address (MBA) field contains a variable-length code for the difference between the current macroblock's address and that of the previously sent GOB's block (since not all macroblocks are sent for every GOB). The MTYPE field specifies the manner in which the current macroblock's data were encoded; the data may be the result of comparing the raw data with a neighbor macroblock's data, with the corresponding data from a previous picture, with filtered versions of either of them, etc. If an MQUANT field is present, its contents supersede the default quantization that the GQUANT field in the enclosing GOB's header specifies.

The CBP field specifies the macroblock's constituent "blocks" for which the macroblock field contains data. There are at most six such blocks. The first four represent the luminance (Y) information from respective segments of a macroblock subregion divided as FIG. 11's left rectangle illustrates. The fifth and sixth block fields represent more-sparsely sampled blue ($C_B$) and red ($C_R$) color-difference values covering the whole macroblock region, as FIG. 11's center and right rectangles indicate. Each block field's contents are coefficients of an 8×8 discrete cosine transform of the data that remain after any subtraction by previous-image data.

The RTP specification suggests that the RTP packets sent be smaller than the largest packet supported by the underlying transport mechanism. For UDP/IP over Ethernet 1500 bytes per packet is typically set for efficient packet send rate and packet overhead minimization. Various terminals take this as a maximum size. The mentioned RFCs (i.e., RFC 2032 and RFC 2190) comment that where a video picture is too large for a packet, it shall be broken at a GOB or a macroblock boundary. In instances where a GOB size itself is larger than 1500 bytes, the RFCs suggest that the GOB be broken at the macroblock boundary. An end-point such as a terminal needs only a codec in order to perform the macroblock fragmentation. Because the codec knows the start and end of each macroblock boundary and size during the encoding of the video stream, macroblock parsing during packetization can be performed as a natural outcome of the encoding process. Macroblock parsers are known and may be constructed in accordance with RFC 2032 or RFC 2190.

However, macroblock parsing may not be that easily implemented in other devices, for example, an MCU. The MCU needs to first decode the packets into its video stream constituents before it is able to perform similar macroblock parsing (when encoding). However, the MCU performs numerous tasks within a video teleconferencing system, including the multitasking of a plurality of concurrent conferences. Accordingly, the decoding and macroblock parsing of videostreams burdens and degrades the MCU's processing performance. In some devices, the processing overhead may be unacceptable.

SUMMARY OF THE INVENTION

According to the present invention, though, macroblock is provided without such processing overhead. Instead of using a macroblock parser to parse at macroblock boundaries in instances where the GOB is larger than the maximum transmission unit size, the incoming packets are monitored for partial GOBs. A partial GOB is one in which the GOB was previously parsed into portions by a device for compliance. The partial GOB is detected by monitoring the header GOB number (GOBN) field located at the H.261 header of the packet. If the GOBN value is zero, this indicates that the preceding GOB is complete. However, if the GOBN value is non-zero, the GOB has been parsed at a macroblock boundary upstream. Pertinent information pertaining to the macroblock fragmentation is then retrieved and stored for future use. For instance, because the current GOB is a continuation of the last read GOB (assuming that the packets were properly sequenced) the bit count of the last GOB is stored along with the values of the MBAP field, QUANT field, HMVD field, and VMVD field also located at the H.261 header. The pertinent partial GOBs are then combined to form a complete GOB. Subsequently, when this complete GOB needs to be parsed again for transmission, the stored information, that is, the bit count, the MBAP value, the QUANT value, the HMVD value, and the VMVD value are retrieved to parse the complete GOB back to its previous state (i.e., partial GOBs). In this manner, macroblock parsing is performed without the use of a macroblock parser and thereby eliminates the processing overhead associated with the macroblock parser.

BRIEF DESCRIPTION OF THE DRAWINGS

The invention description below refers to the accompanying drawings, of which:

FIG. 6 is a diagram of a single picture's division into groups of blocks ("GOBs") in common intermediate format (CIF);

FIG. 7 is a diagram of a single picture's division into groups of blocks ("GOBs") in quarter common intermediate format (QCIF);

FIG. 9 is a diagram illustrating a single-GOB picture segment's division into subregions represented by respective "macroblocks";

DETAILED DESCRIPTION OF AN ILLUSTRATIVE EMBODIMENT

Continuous presence designed in accordance with H.261 recommendation allows for several sites to be seen simultaneously on one screen. In one example, it takes advantage of the following characteristics of the H.261 data stream and the H.323 end-points. For instance, the H.261 recommendation specifies that two picture scanning formats may be used in a codec. The first format, known as a Common Intermediate Format (CIF), divides a picture into twelve groups of blocks (GOBs) numbered 1–12 as shown in FIG. 6. The second format, known as a quarter-CIF (QIF), divides a picture into three GOBs numbered 1, 3 and 5 as shown in FIG. 7. Notably, the H.323 end-points could send pictures in QCIF while receiving CIF pictures. As will be described in more detail with respect to FIGS. 13–16, a multipoint control unit (MCU) could select the four most appropriate sites, receive the QCIF GOBs from those sites, renumber the QCIF GOBs to fit into a CIF, and distribute the resultant image to the conferencing end-points. In this manner, four conferencing sites may be viewed on the screen. Note that the above description describes one conference session, and the MCU may coordinate several conference sessions concurrently.

Figure 1:
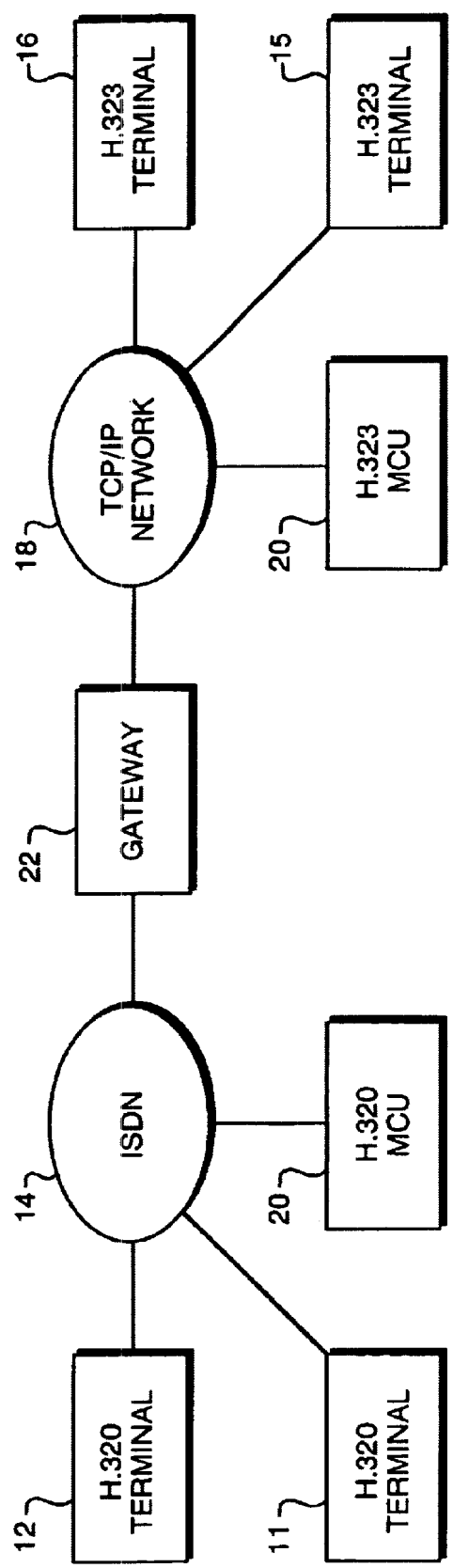
FIG. 1 is a block diagram of a communications topology illustrating an example of a typical environment in which the present invention can be employed.
Figure 2:
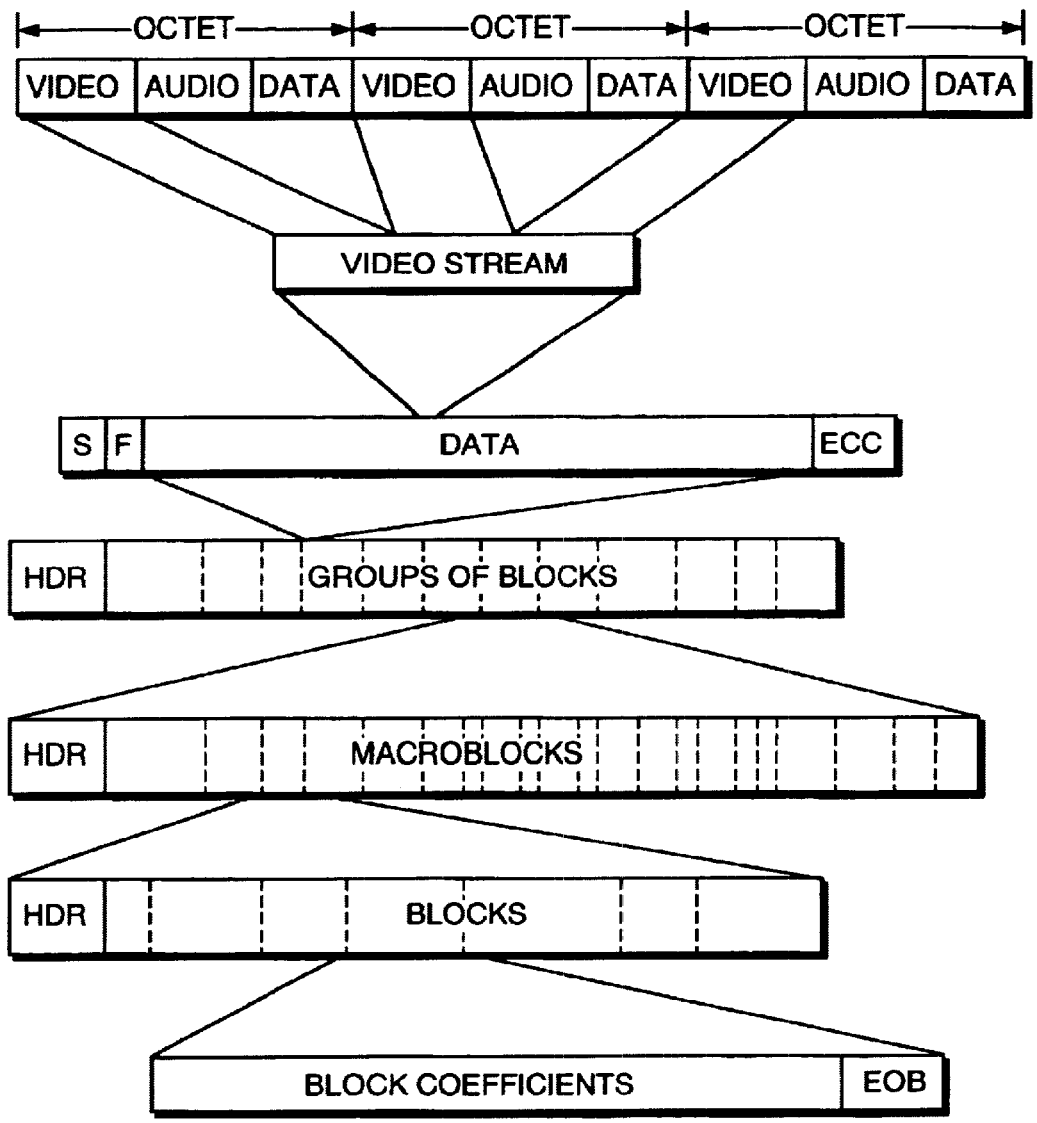
FIG. 2 is a diagram that illustrates the format of a video stream as initially sent by an H.320 end-point and is then converted to an H.261 format.
Figure 3:
FIG. 3 is a diagram illustrating the format of a typical link-level packet used to transmit the video stream.
Figure 12:
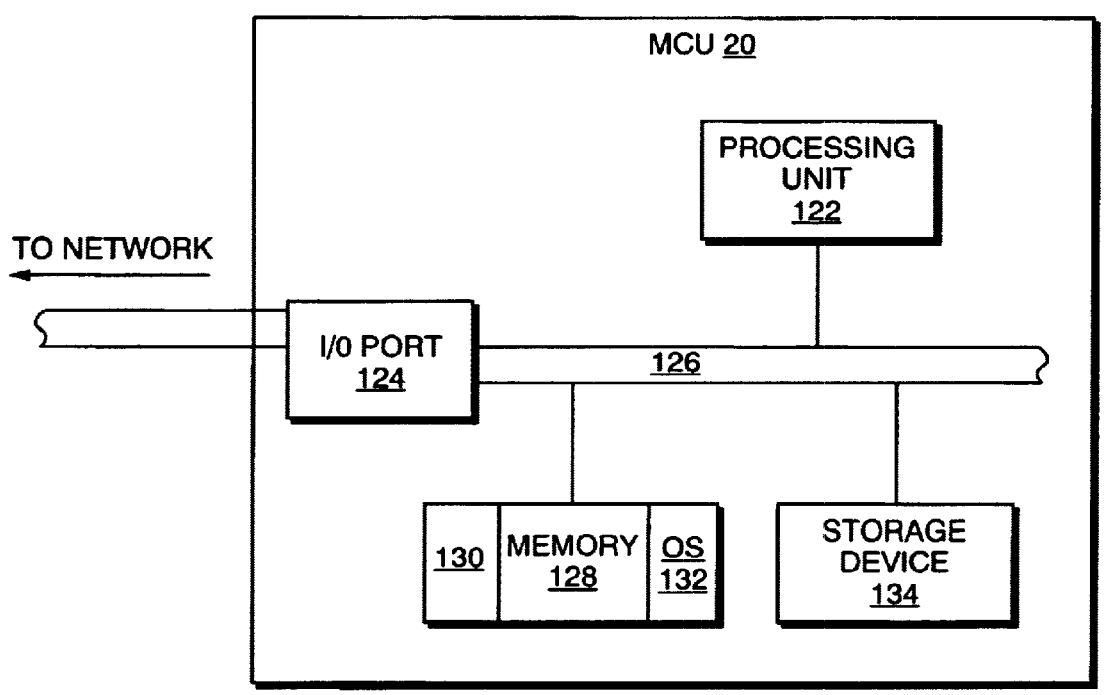
FIG. 12 is a diagram of a multipoint control unit ("MCU") of a type that can embody the present invention.

As shown in FIG. 12, the MCU 20 may be a commercially available computer capable of connecting to a network through an input/output (I/O) port 124. According to the illustrated embodiment, the I/O port 124 is an Ethernet card that transmits and receives packets in the format shown in FIG. 3. The MCU 20 further comprises a processing unit 122 and a main memory 128 coupled together through a bus 126. The processing unit 122 may be a microprocessor, a microcontroller, digital signal processors (DSPs), application specific integrated circuits (ASICs), or the like. Although the figure shows a single processing unit 122, one skilled in the art will understand that a multiprocessing unit may be used to make the MCU 20 perform faster.

Typical processing units will operate in accordance with software stored temporarily in the main memory 128 to control the various hardware of the MCU and facilitate multitasking as well as networking. Such software usually includes an operating system 132 and an MCU module 130. That module directs the processing unit 122 to perform various MCU operations as will be apparent from FIGS. 13–16.

Further coupled to the bus 126 are various resources such as a storage device 134 with a magnetic or an optical media that may be used persistent storage of the abovementioned software. Again, it will be apparent to one skilled in the art that the MCU module 130 can instead be implemented in hardware such as an application specific integrated circuit (ASIC).

Figure 13:
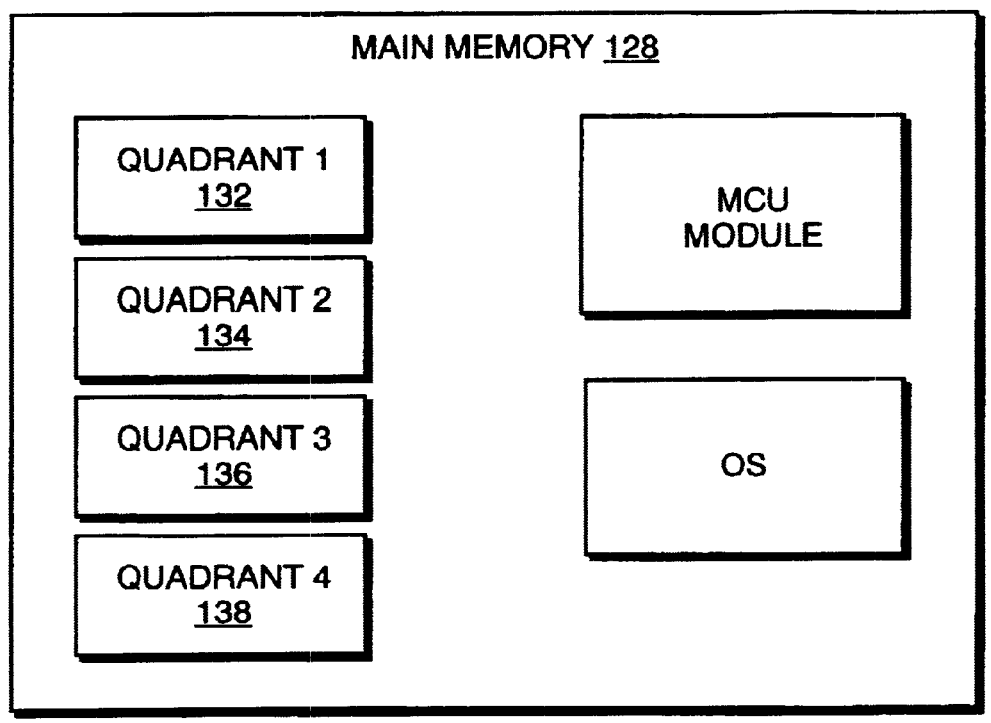
FIG. 13 is a more-detailed diagram of a main memory showing buffers for storing QCIF pictures for each site.
Figure 14:
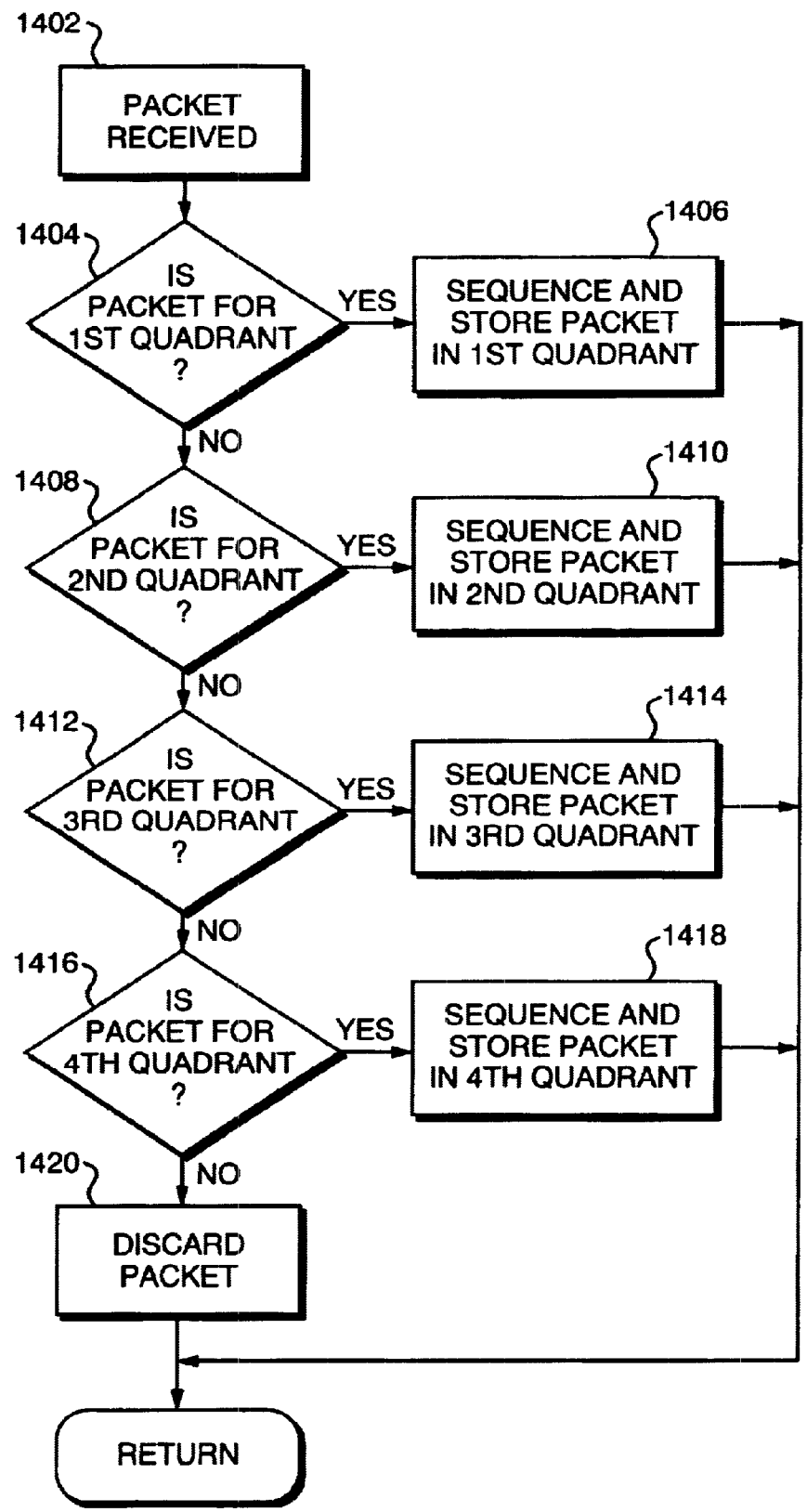
FIG. 14 is a flow chart of a routine for storing packets representing QCIF pictures into their respective quadrants in a CIF picture.

The MCU 20 receives various QCIF packets from the several sites via the I/O port 124 and decides which four conferencing sites should be viewed. (Note that the description will be given using a single conference session as an example.) In one example, the sites selected will be those of the loudest speaker and of the three most recent previous loudest speakers. The MCU 20 then maintains for each site a separate buffer in the memory 128 to accumulate the inbound packets as shown in FIG. 13. The buffers 132–138 should be big enough to accumulate and queue enough packets to represent at least one QCIF picture. Each stored site will represent a quadrant in the outbound fourquadrant CIF picture forming the continuous presence. The MCU does not decode the QCIF pictures into their video stream constituents. Instead, it stores them in their GOB format. Because each QCIF picture comprises three GOBs and a quadrant in the CIF picture also comprises three GOBs (with four quadrants representing total of twelve is GOBs), forming the CIF picture is simply a matter of determining into which quadrant each GOB should be placed. FIG. 14 illustrates the process for doing so.

Figure 4:
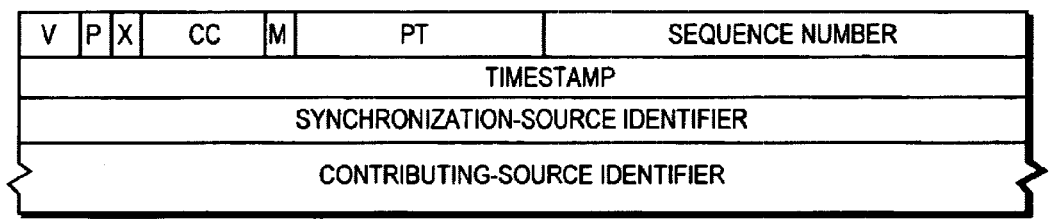
FIG. 4 is a diagram illustrating the RTP header of FIG. 3.
Figure 5:
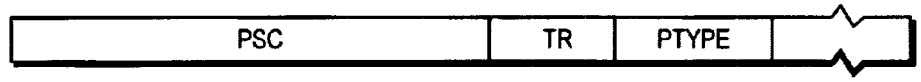
FIG. 5 is a diagram illustrating the header of a single-picture portion of the video stream.
Figure 8:
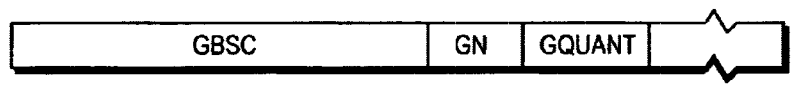
FIG. 8 is a diagram illustrating the header of a GOB portion of the video stream.
Figure 10:
FIG. 10 is a diagram illustrating a macroblock header.

In block 1402, the MCU receives an inbound packet, and in blocks 1404, 1408, 1412 and 1416, it decides in which quadrant the packet should be stored. One method may be to look at the source address of the packet to determine the site it came from. The packet is then forwarded to the correct quadrant. In block 1406, as in blocks 1410, 1414, and 1418, the MCU first looks for a packet having a picture start code (PSC) that indicates the start of a new QCIF picture. Once such a packet is read, successive incoming packets, which belong to this picture, are sequenced using the sequence number in the packet's RTP header (see FIG. 4) and stored in a queue. If a gap in the sequence is formed during sequencing, the gap usually indicates a missing packet. But the MCU returns the accumulated packets for that gap-containing picture for a while before deciding that the packet has been lost. It then discards those packets. Once the packet has been properly sequenced and stored, the MCU returns for the next packet. It may be that the MCU receives a packet that does not belong to any of the quadrants, or it may detect that the packet is corrupt. As block 1420 indicates, the packet is dropped and the MCU returns to block 1402 to wait for the next incoming packet. This process is repeated until sufficient packets are collected in the queue to make up at least one complete QCIF picture.

Figure 17:
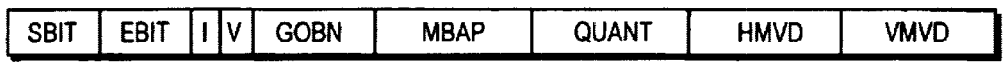
FIG. 17 is a diagram of FIG. 3's H.261 header.
Figure 11:
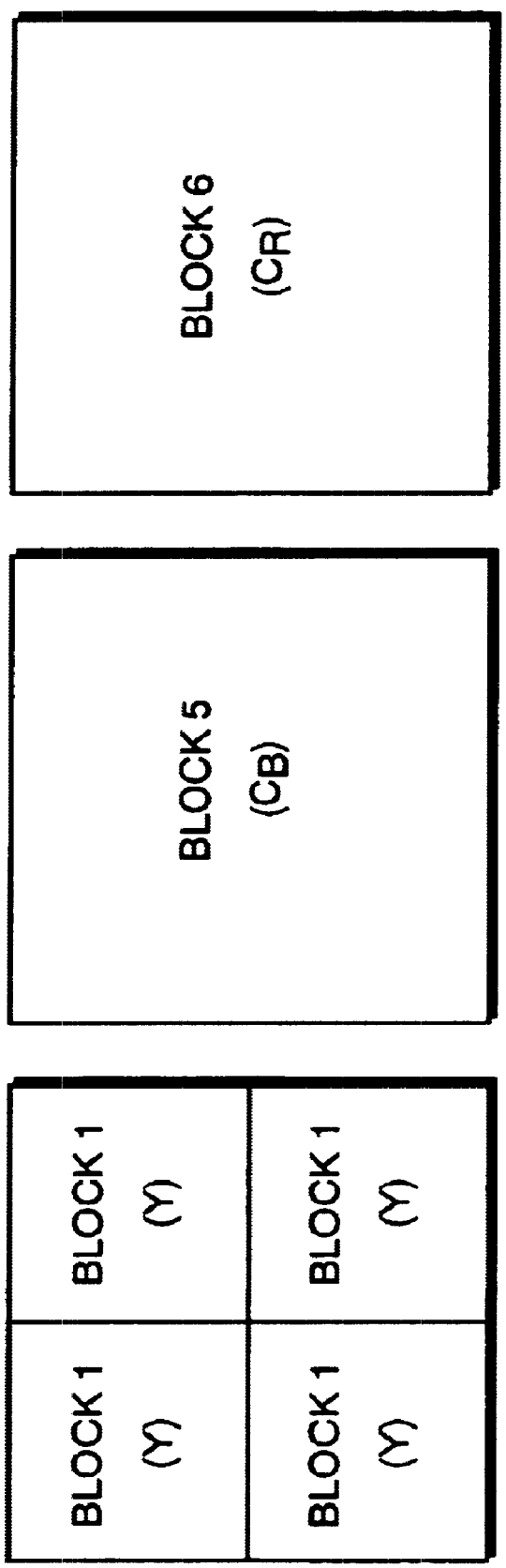
FIG. 11 is a diagram illustrating a macroblock region's coverage by its constituent blocks.
Figure 15:
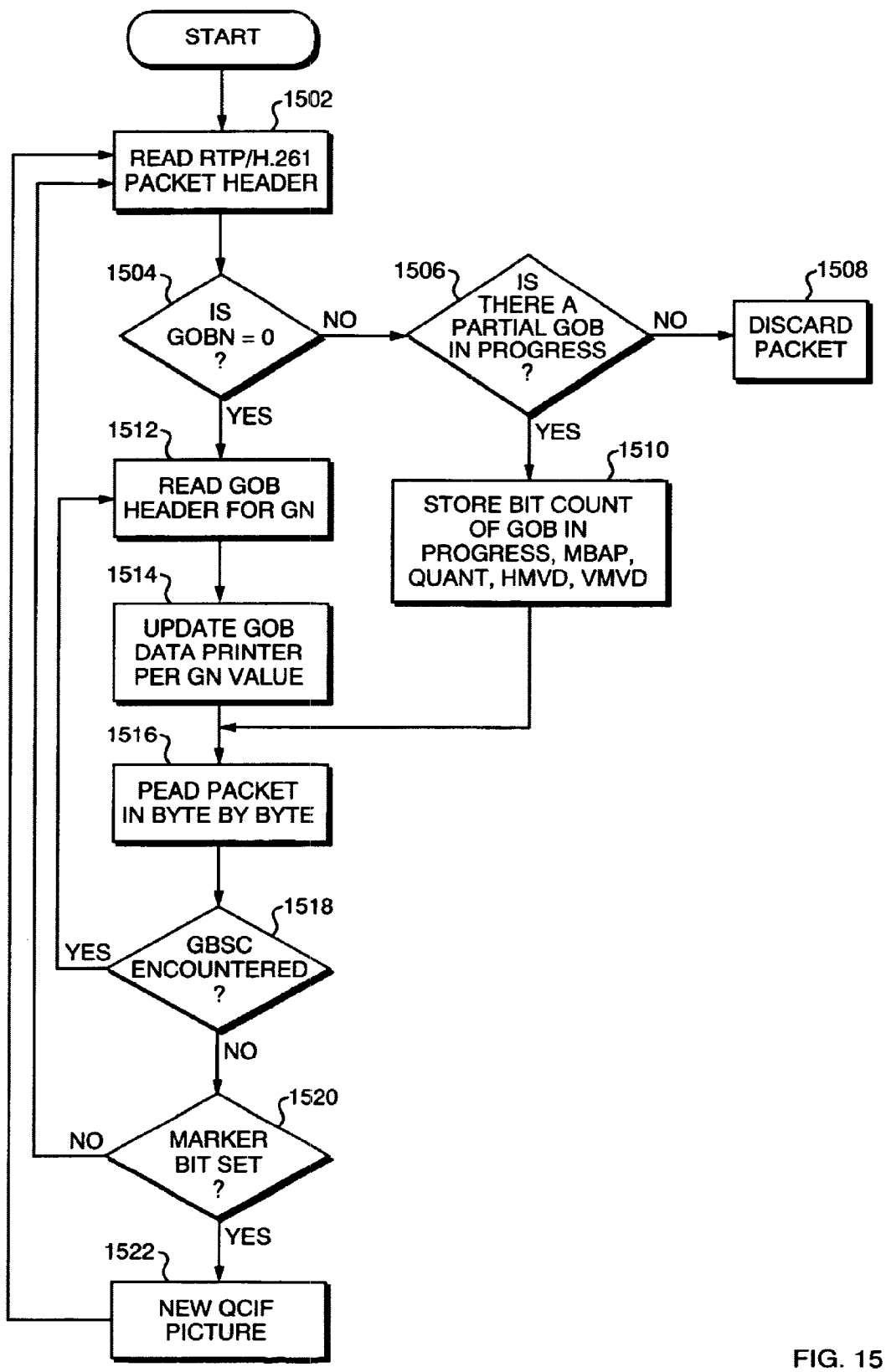
FIG. 15 is a flow chart of a routine for storing pertinent information related to macroblock parsing.

FIG. 15 is a more detailed flow diagram showing, after the quadrant has been identified, how the QCIF packets are parsed and stored in the queue in accordance with the invention. The H.261 packet header of an incoming packet, that has been sequenced is parsed in block 1502 to read the header GOB number (GOBN) field. This is best illustrated in FIG. 17, which is a diagram of FIG. 3's H.261 header field. In block 1504, a reading of a zero in the GOBN field indicates that the GOB contained in the packet begins at a GOB boundary, in which case its corresponding GOB header is parsed to read the GOB group number (GN). However, if the reading is a non-zero, this indicates that the contained GOB has been broken on a macroblock boundary and may be part of a GOB from a previous packet. Thus, in block 1506, the GOBN field is compared with the GN field of the last processed packet. If the two fields match, this indicates that the previously processed GOB was partially filled and this GOB is part of that GOB. Otherwise, if there is a mis-match, it is assumed that the packet is corrupt and is discarded in block 1508. Note that blocks 1506–1508 may be an optional safeguard feature. In other words, if at block 1504, the GOBN field is non-zero, the contained GOB could automatically be added into the GOB position to which a GOB data pointer is currently pointing.

For non-zero GOBN field packets, in block 1510, the number of bits counted to the previous GOB is placed in memory to indicate when that previous GOB was broken, as is information stored in the current packet's H.261 header, including the MBAP field (which indicates the last MBA encoded in the previous packet), the QUANT field (which indicates the quantizer value in effect prior to the start of this packet) and the reference motion vector data fields HMVD, VMVD (for computing the true MVDs contained in this packet). The stored state information above allows for a partial GOB to be independently decoded by a decoder. Thus, the stored bit count and information later allows the MCU to macroblock parse the GOB, if necessary, without using a macroblock parser thereby enhancing the MCU performance.

If the GOB teld is zero, then in block 1512, the GOB header is parsed to read the GN field. Note that this block is bypassed when the GOBN field is non-zero because the packet would not contain a GOB header. The GN value is significant in that it determines the GOB's position in the QCIF. Basically, the QCIF comprises GOBs 1, 3, and 5. The GN value indicates whether the current GOB is GOB 1, 3, or 5, and the GOB data pointer is updated in block 1514 to point to a data structure allocated for that GOB position. In block 1516, the packet data is read byte by byte into the GOB position pointed to by the GOB data pointer, and a counter in the data structure is implemented to indicate where the next byte should be stored. Unless it is updated in response to receipt of a GN value, the GOB data pointer points to its last position, and storage in that structure resumes where the pointer indicates. As data is read in, it is also checked for a GOB header in block 1518, because the packet may contain more than one GOB. Specifically, if a byte of all zeros is read, preceding and subsequent bytes are read and compared to see if they form a $0001_H$ sequence, which signifies either a new GOB or a new picture. If such a sequence is found, the MCU reverts to block 1512 to read the GOB header for the GN value, and the GOB data pointer is updated correspondingly in block 1514. Note that if a picture start code (PSC) is encountered, the MCU infers that the QCIF is complete and a new QCIF is about to start. In any event, the GOB data pointer points to the appropriate GOB position and the packet data is read in byte by byte. Note that GOBs are of variable length so that it is difficult to predict its length unless the boundaries of the GOB are detected, which in this instance is the $0001_H$ sequence.

In the RTP header, there is a marker bit M, which when set to 1, indicates that the packet is the last packet of a picture. Thus, as an alternative to detecting the PSC code, in block 1520, the incoming packet is further monitored for the set marker bit M, which by definition indicates that the packet completes the QCIF. In any event, the MCU makes note of the completed QCIF in block 1522 and starts a new QCIF. The MCU performs this process for all quadrants. Once complete QCIFs are formed, they are ready to be converted into a CIF picture.

From the completed QCIF picture in each queue, the MCU takes the position of the GOBs in the individual QCIFs and organizes them so that they are in the correct GOB position in the CIF picture. As previously mentioned, the CIF picture can be viewed as four quadrants in which each quadrant will eventually be occupied by a QCIF. Below is a table that shows how the QCIF GOBs GN numbers correlate with the CIF GOBs GN numbers.

TABLE 1

| Quadrant | QCIF GN No. | CIF GN No. |
|---|---|---|
| 1 | 1 | 1 |
| 1 | 3 | 3 |
| 1 | 5 | 5 |
| 2 | 1 | 2 |
| 2 | 3 | 4 |
| 2 | 5 | 6 |
| 3 | 1 | 7 |
| 3 | 3 | 9 |
| 3 | 5 | 11 |
| 4 | 1 | 8 |
| 4 | 3 | 10 |
| 4 | 5 | 12 |

Figure 16:
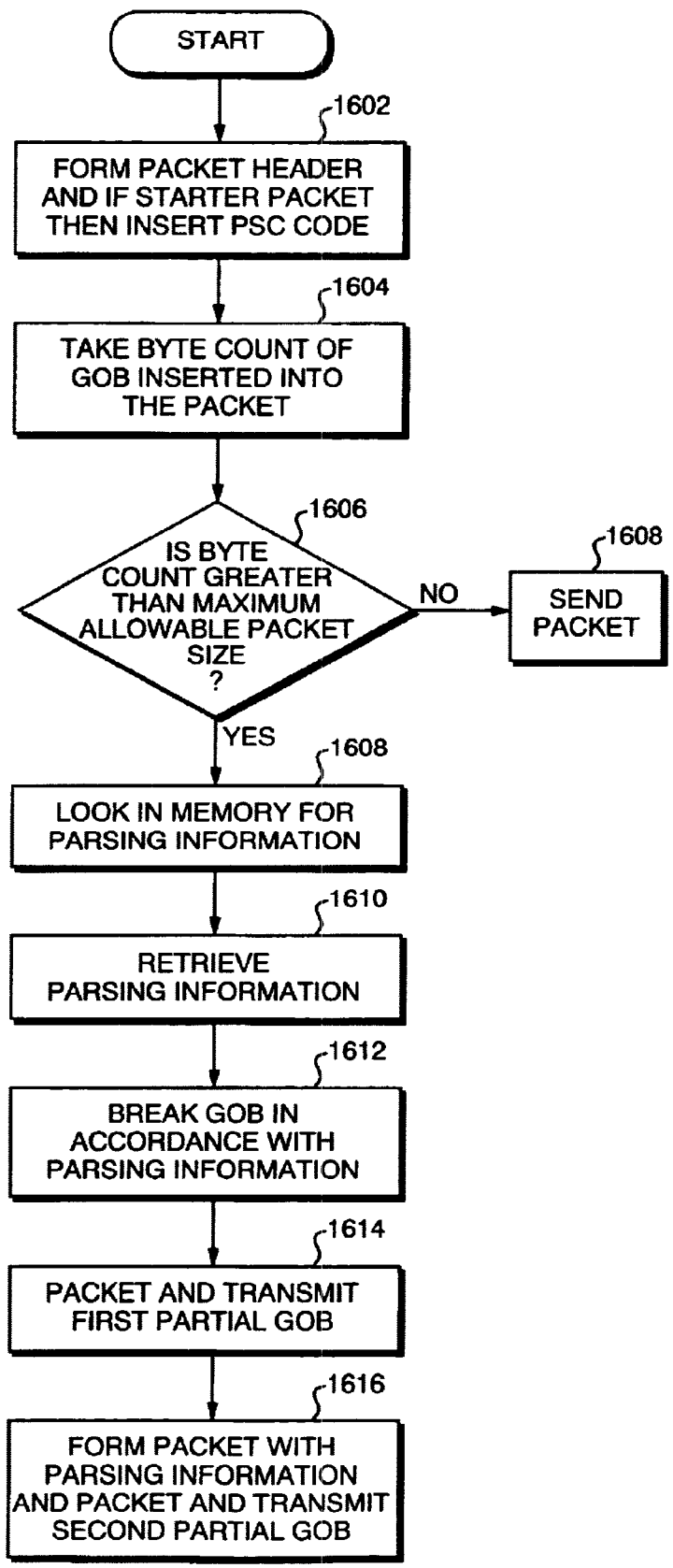
FIG. 16 is a flow chart of a routine for utilizing pertinent information related to macroblock parsing.

A quadrant for which not all packets have been received is marked as "in progress," means the quadrant data are not yet ready for transmission. However, safeguards must be placed to ensure that the quadrant waits for only a limited period of time. If the packets or packets needed are not received within that period, the accumulated data is purged and GOBs having zeros as payload are sent instead. Once the composite CIF picture is generated, the GOBs are adapted for packet transmission. The process shown in FIG. 16 is used to prevent the resultant packets' sizes from exceeding the largest packet supported by the underlying transport mechanism (for instance, 1500 bytes).

In block 1602, pertinent header information in accordance with the RTP protocol and the H.261 recommendation is formed for a packet. If the packet is a "starter" packet, a PSC code is also included. In block 1604, a byte count is taken of a GOB to be inserted into the packet. In block 1606, the total byte count of the packet (byte count of the packet header and the GOB) is compared with the maximum byte size allowable for transmission. If the packet size is allowed, then in block 1608, the packet is transmitted. Alternatively, to minimize the number of packets to be transmitted, and thereby enhance network performance, another GOB may be selected and its byte count read to determine if there is sufficient space in the packet to accommodate this GOB. If so, this GOB is also added to the packet. The process may be repeated until the maximum packet size is reached, in which case the packet is closed and transmitted.

If the GOB size does exceed the maximum allowable size, in block 1608, the MCU looks into its memory contents to determine if the GOB had previously been parsed at a macroblock boundary. Note that in FIG. 15, block 1510, the MCU stored state information on incoming GOBs that were parsed on macroblock boundaries. The rationale is that the maximum packet size is also applicable to the source point that sent the GOB. Thus, if the GOB to be transmitted is too large, then the GOB was originally received in partial GOBs broken at one or more macroblock boundaries. If the GOB had been previously parsed at the macroblock boundary, in block 1610, the MCU retrieves from the memory the stored bit count corresponding to the GOB in progress and the state information including MBAP, QUANT, HMVD and VMVD values. From the stored information, in blocks 1612–1616, the MCU packetizes a first partial GOB having a size equal to the stored bit count along with the applicable RTP header and the H.261 header, and packetizes a second partial GOB with the state information (MBAP, QUANT, HMVD and VMVD) contained in the H.261 header along with other information and the RTP header. If the GOB was originally broken in several macroblock boundaries, the MCU will have stored an equal number of bit counts and state information, which are used to break the GOB at the respective macroblock boundaries. The process is repeated until all GOBs in the CIF picture have been processed and transmitted. Note that in the last GOB transmitted for the CIF picture, a marker bit M is set in the RTP header to signify that the CIF picture is complete.

To emphasize the process above, suppose that four GOBs sized 1000 bytes, 200 bytes, 2000 bytes and 500 bytes, respectively, are to be transmitted. In this example, the bytes consumed by the headers will be ignored. In the first packet, the first GOB sized 1000 bytes will be read in byte by byte. Because the packet has space for additional 500 bytes, the second GOB sized 200 bytes will be read in. This leaves room for 300 more bytes since the third GOB's 2000-bytes size exceeds the maximum allowable packet size of 1500 bytes that GOB will need to be broken up, so some of the resulting macroblocks may fit into the 300 bytes left in the packet currently being formed. To divide the 200-byte GOB appropriately, the MCU recalls the information stored for that GOB. Specifically, it retrieves the stored bit count, MBAP, QUANT, HMVD and VMVD values. Say, from the bit count, it is found that the GOB was previously broken into two partial GOBs of 1000 bytes each. Since this size is greater than the 300 bytes left in the packet being assembled, that packet is closed and transmitted. This packet is followed by a second packet containing the partial GOB of 1000 bytes. The third packet will contain the latter partial GOB of 1000 bytes with state information stored in the H.261 header. Because the third packet has room for another 500 bytes, the next GOB's byte count is read. Since the next GOB contains only 500 bytes, it will be added to the packet and transmitted.

Accordingly, it will be readily apparent that the present invention enables GOBs to be divided appropriately without performing a conventional macroblock parsing process. The invention thereby does away with the processing overhead caused by operating a macroblock parser.

What is claimed is:

1. A method for providing macroblock parsing in a packet to comply with a maximum-transmission-unit size, the packet having at least one group of blocks (GOBS) representing a portion of a video picture, the GOB further divided into macroblocks, the method comprising the steps of:
    determining whether a GOB of a current packet is partial; and if so, then
        storing a bit count of a GOB of a previous sequential packet; and
        storing header information contained in the current packet that allows the macroblocks of the GOB of the current packet to be decoded.

2. The method of claim 1, wherein the stored header information includes an MBAP value, a QUANT value, an HMVD value and a VMVD value stored in an H.261 header of the current packet.

3. The method of claim 1, further comprising the steps of:
    determining a byte count of a GOB to be packetized for compliance with the maximum-transmission-unit size; and,
    if the GOB is non-compliant, then
        retrieving the bit count associated with the GOB to be packetized;
        parsing the GOB to be packetized into a partial GOB, the size of the partial GOB corresponding to the bit count;
        packetizing the partial GOB;
        retrieving the header information associated with the GOB to be packetized; and
        packetizing a remaining portion of the GOB to be packetized such that a header includes the retrieved header information.

4. The method of claim 1, wherein the step of determining whether the GOB of the current packet is partial further comprises the steps of:
    reading a header GOB number (GOBN) value associated with the GOB;
    determining that the GOB is non-partial if the GOBN value is zero; and
    determining that the GOB is partial if the GOBN value is non-zero.

5. The method of claim 4, wherein a GOB data pointer points to a position in which a previous GOB data has been read in, the method further comprising the steps of:
    if the GOBN value is zero, then
        reading a GOB group number (GN) value associated with the GOB of the current packet;
        updating the GOB data pointer in accordance with the GN value;

reading the GOB of the current packet into the position pointed by the GOB data pointer; and if the GOBN value is non-zero, then
reading the GOB of the current packet into the position pointed to by the GOB data pointer.

6. The method of claim 5, wherein reading the GOB of the current packet into the position pointed by the GOB data pointer further comprises the steps of:

reading in the GOB byte by byte;
if a GOB start code (GBSC) is encountered then
associating the GBSC with another GOB in the current packet;
reading a GN value associated with the another GOB in the current packet;
updating the GOB data pointer in accordance with the GN value associated with the another GOB; and
reading the another GOB in the current packet into the position pointed by the GOB data pointer.

7. The method of claim 4, further comprising the steps of:
reading the header GOB group number (GN) associated with the GOB of the current packet;
comparing the GN value with the read GOBN value; and
discarding the packet if the GN value does not correspond with the GOBN value.

8. A processor executable medium containing computer instructions therein, which when executed by a processor causes the processor to provide macroblock parsing in a packet to comply with a maximum-transmission-unit size, the packet having at least one group of blocks (GOBs) representing a portion of a video picture, the GOB further divided into macroblocks, the processor performing the steps comprising:

determining whether a GOB of a current packet is partial; and if so, then
storing a bit count of a GOB of a previous sequential packet; and
storing a header information contained in the current packet that allows the macroblocks of the GOB of the current packet to be decoded.

9. The processor executable medium of claim 8, wherein the stored header information includes an MBAP value, a QUANT value, an HMVD value and a VMVD value stored in an H.261 header of the current packet.

10. The processor executable medium of claim 8, further comprising the steps of:

determining a byte count of a GOB to be packetized for compliance with the maximum-transmission-unit size;
and if the GOB is non-compliant, then
retrieving the bit count associated with the GOB to be packetized;
parsing the GOB to be packetized into a partial GOB, the size of the partial GOB corresponding to the bit count;
packetizing the partial GOB;
retrieving the header information associated with the GOB to be packetized; and
packetizing a remaining portion of the GOB to be packetized such that a header includes the retrieved header information.

11. The processor executable medium of claim 8, wherein the step of determining whether the GOB of the current packet is partial further comprises the steps of:

reading a header GOB number (GOBN) value associated with the GOB;
determining that the GOB is non-partial if the GOBN value is zero; and
determining that the GOB is partial if the GOBN value is non-zero.

12. The processor executable medium of claim 11, wherein a GOB data pointer points to a position in which a previous GOB data has been read in, the step further comprises:

if the GOBN value is zero, then
reading a GOB group number (GN) value associated with the GOB of the current packet;
updating the GOB data pointer in accordance with the GN value;
reading the GOB of the current packet into the position pointed by the GOB data pointer;

and if the GOBN value is non-zero, then
reading the GOB of the current packet into the position pointed by the GOB data pointer.

13. The processor executable medium of claim 12, wherein reading the GOB of the current packet into the position pointed by the GOB data pointer further comprises the steps of:

reading in the GOB byte by byte;
if a GOB start code (GBSC) is encountered then
associating the GBSC with another GOB in the current packet;
reading a GN value associated with the another GOB in the current packet;
updating the GOB data pointer in accordance with the GN value associated with the another GOB; and
reading the another GOB in the current packet into the position pointed by the GOB data pointer.

14. The processor executable medium of claim 11, further comprising the steps of:

reading the header GOB group number (GN) associated with the GOB of the current packet;
comparing the GN value with the read GOBN value; and
discarding the packet if the GN value does not correspond with the GOBN value.

15. An apparatus to provide macroblock parsing in a packet to comply with a maximum-transmission-unit size, the packet having at least one group of blocks (GOBs) representing a portion of a video picture, the GOB further divided into macroblocks, the apparatus comprising:

a processor configured to determine whether a GOB of a current packet is partial;
and if so, then
the processor configured to store a bit count of a GOB of a previous sequential packet in memory; and
the processor configured to store header information contained in the current packet in memory, the header information allowing the macroblocks of the GOB of the current packet to be decoded.

16. The apparatus of claim 15, wherein the stored header information includes an MBAP value, a QUANT value, an HMVD value and a VMVD value stored in an H.261 header of the current packet.

17. The apparatus of claim 15, further comprising:
the processor configured to determine a byte count of a GOB to be packetized for compliance with the maximum-transmission-unit size; and,
if the GOB is non-compliant, then
the processor configured to retrieve the bit count associated with the GOB to be packetized from the memory;

the processor configured to parse the GOB to be packetized into a partial GOB, the size of the partial GOB corresponding to the bit count;

the processor configured to packetize the partial GOB;

the processor configured to retrieve the header information associated with the GOB to be packetized from the memory; and the processor configured to packetize a remaining portion of the GOB to be packetized such that a header includes the retrieved header information.

18. The apparatus of claim 15, further comprising:

the processor configured to read a header GOB number (GOBN) value associated with the GOB; and the processor configured to determine that the GOB is non-partial if the GOBN value is zero and determine that the GOB is partial if the GOBN value is non-zero.

19. The apparatus of claim 18, further comprising:

a GOB data pointer that points to a position in which a previous GOB data has been read into the memory, wherein:

if the GOBN value is zero, then the processor configured to read a GOB group number (GN) value associated with the GOB of the current packet;

the processor configured to update the GOB data pointer in accordance with the GN value;

the processor configured to read the GOB of the current packet into the position in the memory pointed by the GOB data pointer; and if the GOBN value is non-zero, then the processor configured to read the GOB of the current packet into the position in the memory pointed to by the GOB data pointer.

20. The apparatus of claim 19, wherein the processor configured to read the GOB of the current packet into the position pointed by the GOB data pointer further comprises:

the processor configured to read in the GOB byte by byte;

if a GOB start code (GBSC) is encountered then the processor configured to associate the GBSC with another GOB in the current packet;

the processor configured to read a GN value associated with the another GOB in the current packet;

the processor configured to update the GOB data pointer in accordance with the GN value associated with the another GOB; and the processor configured to read the another GOB in the current packet into the position in the memory pointed by the GOB data pointer.

21. The apparatus of claim 19, further comprising:

the processor configured to read the header GOB group number (GN) associated with the GOB of the current packet;

the processor configured to compare the GN value with the read GOBN value; and the processor configured to discard the packet if the GN value does not correspond with the GOBN value.

* * * * *